US012305600B2

(12) United States Patent
Tanaka

(10) Patent No.: US 12,305,600 B2
(45) Date of Patent: May 20, 2025

(54) FUEL INJECTION VALVE SUPPORT STRUCTURE

(71) Applicant: HITACHI ASTEMO, LTD., Hitachinaka (JP)

(72) Inventor: Naoki Tanaka, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 0 days.

(21) Appl. No.: 18/580,243

(22) PCT Filed: Oct. 17, 2022

(86) PCT No.: PCT/JP2022/038578

§ 371 (c)(1),
(2) Date: Jan. 18, 2024

(87) PCT Pub. No.: WO2023/068223

PCT Pub. Date: Apr. 27, 2023

(65) Prior Publication Data

US 2025/0084815 A1 Mar. 13, 2025

(30) Foreign Application Priority Data

Oct. 19, 2021 (JP) ................................ 2021-171222

(51) Int. Cl.
*F02M 61/14* (2006.01)
*F02M 55/02* (2006.01)

(52) U.S. Cl.
CPC .......... *F02M 61/14* (2013.01); *F02M 55/025* (2013.01); *F02M 2200/856* (2013.01); *F02M 2200/9015* (2013.01)

(58) Field of Classification Search
CPC ............ F02M 61/14; F02M 2200/853; F02M 2200/856; F02M 2200/852; F02M 2200/8015
(Continued)

(56) References Cited

U.S. PATENT DOCUMENTS 9,032,934 B2 * 5/2015 Nakamura ............ F02M 69/04 123/456
9,435,303 B2 * 9/2016 Yasuda ................. F02M 61/14
(Continued)

FOREIGN PATENT DOCUMENTS

EP 0 775 820 B1 2/2022
JP H09-144629 A 6/1997
(Continued)

*Primary Examiner* — Long T Tran
*Assistant Examiner* — James J Kim
(74) *Attorney, Agent, or Firm* — Carrier, Shende & Associates P.C.; Joseph P. Carrier; Fulchand P. Shende

(57) ABSTRACT

A fuel injection valve support structure simple in structure is provided which is capable of preventing a fuel injection valve from rotating about an axis of a valve housing thereof without providing a special rotation-preventing piece on an elastic support member. In this support structure, a base plate (15) of an elastic support member (S) is provided with a notch (19) which receives a valve housing (1). A rotation-preventing protrusion (20) which engages with the notch (19) to prevent rotation of a fuel injection valve (I) about an axis (A) of the valve housing (1) is formed on a synthetic resin formation part (6) which covers the valve housing (1) while protruding a coupler (14) to one side.

4 Claims, 4 Drawing Sheets

(58) Field of Classification Search
USPC .......................................................... 123/470
See application file for complete search history.

(56) References Cited

U.S. PATENT DOCUMENTS

| | | | | |
|---|---|---|---|---|
| 9,506,438 | B2 * | 11/2016 | Inomata ................. | F02M 61/12 |
| 10,094,351 | B2 * | 10/2018 | Oh ......................... | F02M 61/14 |
| 10,934,984 | B1 * | 3/2021 | Roseborsky ......... | F02M 51/005 |
| 11,242,833 | B2 * | 2/2022 | Serra ...................... | F02M 61/14 |
| 2009/0056674 | A1 * | 3/2009 | Furst ...................... | F02M 61/14<br>123/470 |
| 2013/0146030 | A1 | 6/2013 | Lindner et al. | |
| 2013/0220277 | A1 | 8/2013 | Nakamura et al. | |
| 2014/0374512 | A1 | 12/2014 | Honjo et al. | |
| 2018/0372045 | A1 | 12/2018 | Oh et al. | |
| 2022/0243692 | A1 * | 8/2022 | Escalante ............... | F02M 61/16 |

FOREIGN PATENT DOCUMENTS

| | | | |
|---|---|---|---|
| JP | 2008-057430 | A | 3/2008 |
| JP | 2013-164058 | A | 8/2013 |
| JP | 2013-174227 | A | 9/2013 |
| JP | 2013-174228 | A | 9/2013 |

* cited by examiner

FUEL INJECTION VALVE SUPPORT STRUCTURE

TECHNICAL FIELD

The present invention relates to a fuel injection valve support structure used in an engine, and particularly to an improvement in the fuel injection valve support structure in which a fuel nozzle cylinder portion of a valve housing is fitted in an injection valve mounting hole of the engine, a fuel supply cap of a fuel distribution pipe supported by the engine is fitted to a fuel introduction cylinder portion of the valve housing, and an elastic support member biasing the valve housing toward the injection valve mounting hole is interposed between the valve housing and the fuel supply cap, whereby a fuel injection valve is elastically held between the engine and the fuel supply cap to prevent its axial movement.

BACKGROUND ART

Such a fuel injection valve support structure has already been known as disclosed in Patent Literature 1 below.

CITATION LIST

Patent Literature

Patent Literature 1: Japanese Patent Application Laid-Open No. 2013-174227

SUMMARY OF INVENTION

Technical Problem

In such a fuel injection valve support structure, when a fuel injection valve rotates more or less about an axis of a valve housing thereof due to the vibration of an engine during its operation, the direction of fuel injected from a fuel nozzle cylinder portion will change. This results in an adverse effect on the combustion state of the fuel in the engine. Therefore, in the fuel injection valve support structure described in Patent Literature 1, a base plate of the elastic support member is continuously provided with a pair of rotation-preventing pieces which bends and extends from both side ends of the elastic support member toward the fuel nozzle cylinder portion side. These rotation-preventing pieces are brought into contact with flat surfaces formed on both side surfaces of the valve housing to thereby prevent the above rotation of fuel injection valve.

However, the above support structure is accompanied by a drawback that the continuous provision of the base plate with the pair of rotation-preventing pieces complicates the shape of the elastic support member, increases the number of processing steps, and lowers the yield of the material, thereby resulting in the increase in the cost of the support structure.

The present invention has been made in view of such circumstances. It is an object of the present invention to provide a fuel injection valve support structure simple in structure, which is capable of preventing rotation of a fuel injection valve about an axis of a valve housing without providing a special rotation-preventing piece on an elastic support member.

Solution to Problem

In order to achieve the above object, the present invention has a first feature that there is provided a fuel injection valve support structure in which a fuel nozzle cylinder portion of a valve housing is fitted into an injection valve mounting hole of an engine, a fuel supply cap of a fuel distribution pipe supported by the engine is fitted into a fuel introduction cylinder portion of the valve housing, an elastic support member connected to the fuel supply cap so as to prevent rotation about an axis of the valve housing is interposed between the valve housing and the fuel supply cap while biasing the valve housing toward the injection valve mounting hole, and the elastic support member is constituted of a base plate abutting against a base surface facing the fuel supply cap, of a synthetic resin formation part covering an outer peripheral surface of the valve housing while protruding a power feeding coupler to one side, and elastic pieces each extending from one end of the base plate and resiliently contacting the fuel supply cap, and in which the base plate is provided with a notch receiving the valve housing, and a rotation-preventing protrusion engaged with the notch to prevent a fuel injection valve from rotating about the axis of the valve housing is formed on the synthetic resin formation part.

Also, in addition to the first feature, the present invention has a second feature that the elastic pieces are formed in a pair so that a tip portion of each of the elastic pieces overlaps a tip portion of the base plate while straddling the valve housing, and the rotation-preventing protrusion also engages between the tip portions of the pair of elastic pieces.

Further, in addition to the first or second feature, the present invention has a third feature that the rotation-preventing protrusion is arranged between the valve housing and the coupler.

Advantageous Effects of Invention

According to the first feature of the present invention, the base plate of the elastic support member is provided with the notch which receives the valve housing therein, and the rotation-preventing protrusion which engages with the notch is formed on the synthetic resin formation part which covers the valve housing. Therefore, it is possible to prevent the fuel injection valve from rotating about the axis of the valve housing and always stabilize the direction of the fuel injected from the fuel nozzle cylinder portion. Thus, the elastic support member does not need to be continuously provided with the pair of rotation-preventing pieces which complicates the shape thereof. On the other hand, the rotation-preventing protrusion can be integrally formed with the coupler on the synthetic resin formation part which covers the valve housing. Consequently, it is possible to attain cost reduction of the fuel injection valve support structure without increasing the number of members to be processed and by improving the yield of the material.

Also, according to the second feature of the present invention, the tip portions of the pair of elastic pieces straddling the valve housing, of the elastic support member are superposed on the tip portions of the base plate, and the rotation-preventing protrusion also engages between the tip portions of the pair of elastic pieces. Consequently, the force of engagement between the elastic support member and the rotation-preventing protrusion is strengthened, and the rotation of the fuel injection valve can be reliably prevented.

Further, according to the third feature of the present invention, since the above protrusion is arranged between the valve housing and the coupler, the elastic support member can be easily engaged with the rotation-preventing protrusion without being interfered with by the coupler by inserting the elastic support member from the opposite side of the coupler when the elastic support member is inserted between the fuel injection valve and the fuel supply cap, and an assembling property is excellent.

DESCRIPTION OF EMBODIMENTS

An embodiment of the present invention will be described based on the accompanying drawings.

Figure 1:
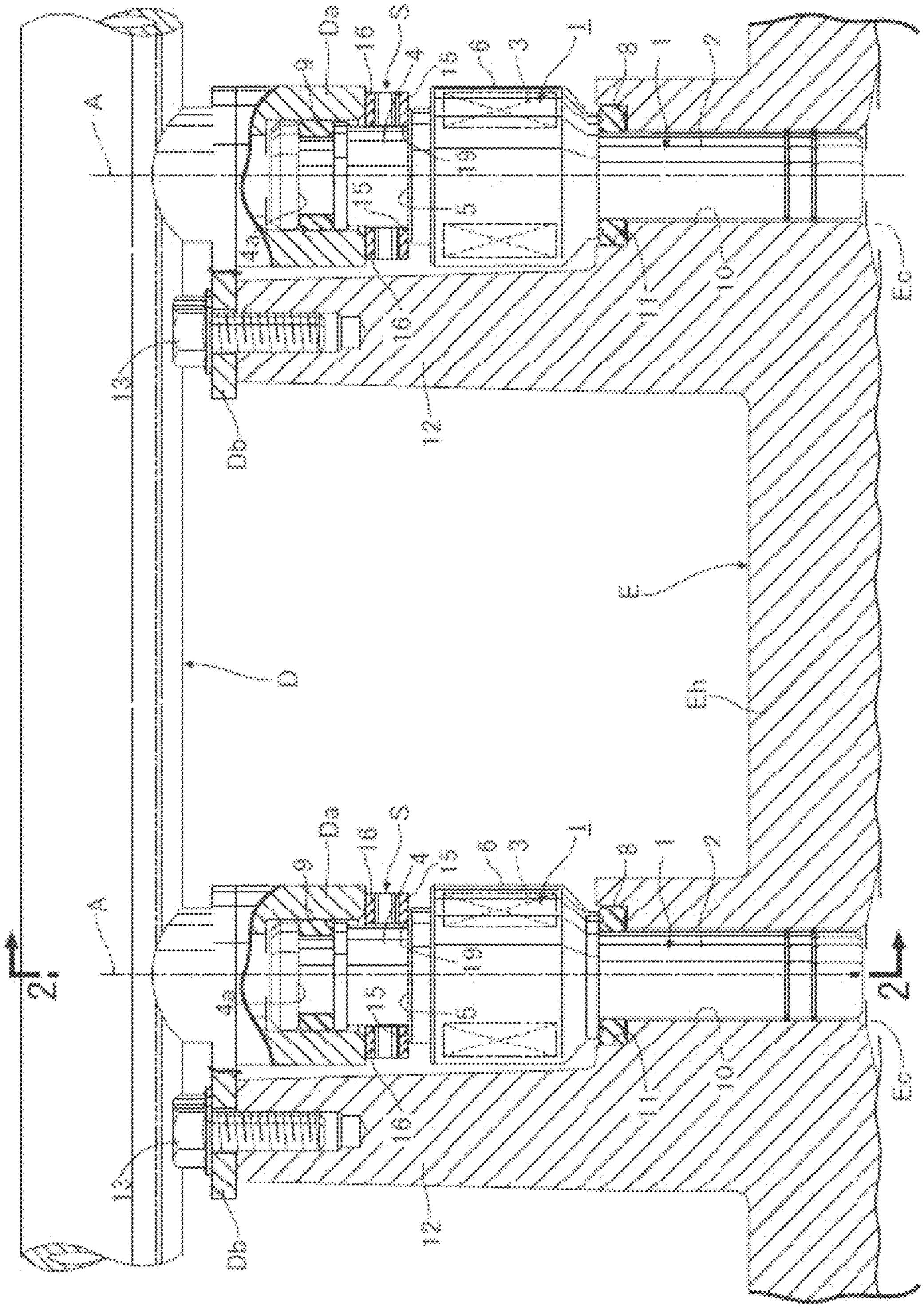
FIG. 1 is a partially longitudinal sectional front view illustrating a fuel injection valve support structure in a multi-cylinder engine according to an embodiment of the present invention.
Figure 2:
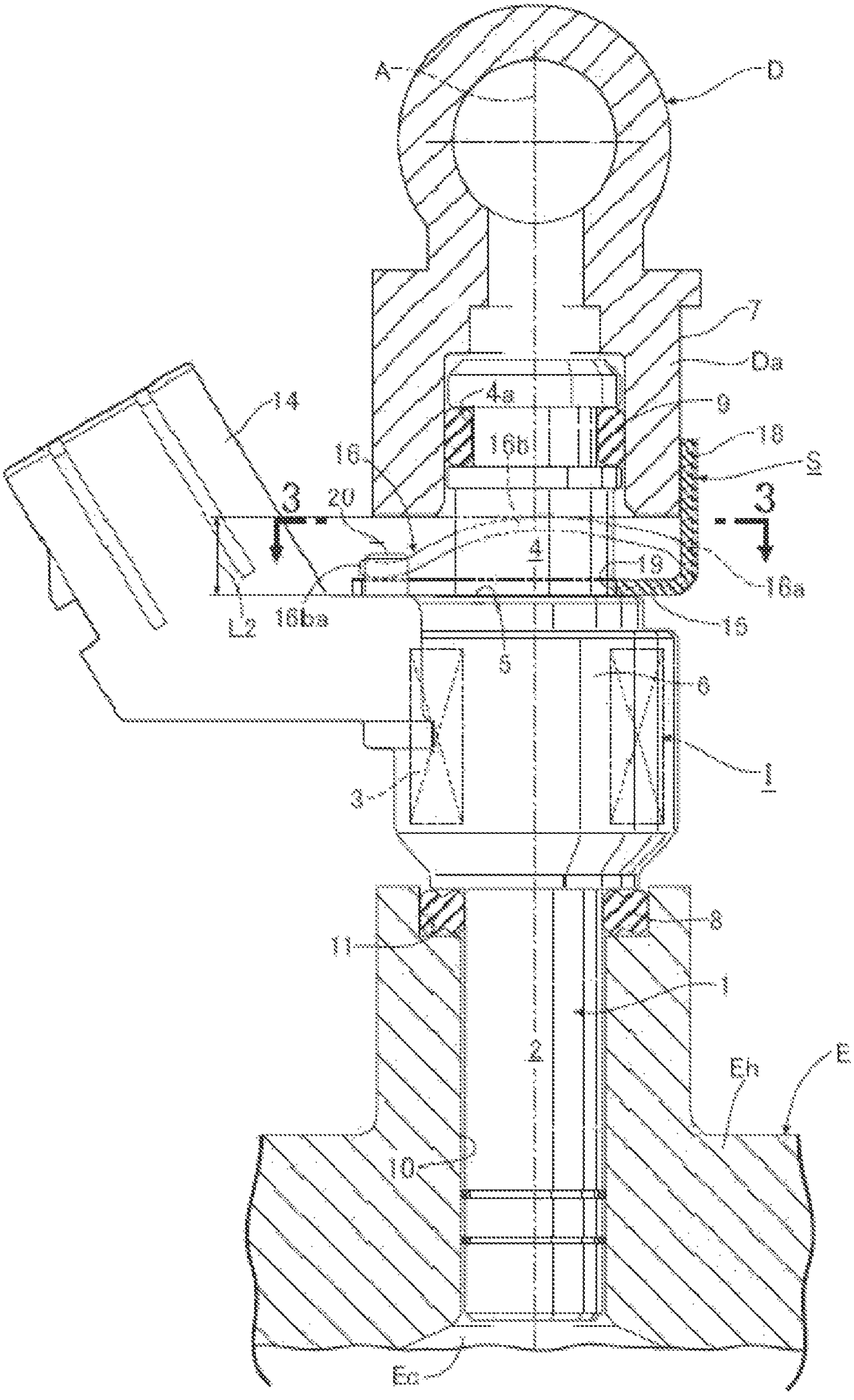
FIG. 2 is an enlarged sectional view taken along line 2-2 of FIG. 1.

First, in FIGS. 1 and 2, a cylinder head Eh of a multi-cylinder engine E is mounted with a plurality of fuel injection valves I capable of injecting fuel into combustion chambers Ec of a plurality of cylinders, and a fuel distribution pipe D which distributes the fuel to these fuel injection valves I. Further, an elastic support structure having an elastic support member S is used to hold each fuel injection valve I in place. The structure will be detailed below.

Each fuel injection valve I has a cylindrical valve housing 1 at its center. A front end of the valve housing 1 is configured as a fuel nozzle cylinder portion 2, a rear end thereof is configured as a fuel introduction cylinder portion 4, and an intermediate portion thereof is configured as an electromagnetic coil portion 3. When the electromagnetic coil portion 3 is energized, a valve in the fuel nozzle cylinder portion 2 is opened to inject the fuel introduced by the fuel introduction cylinder portion 4 from the fuel distribution pipe D into the corresponding combustion chamber Ec.

Further, the electromagnetic coil portion 3 is covered with a synthetic resin formation part 6. A coupler 14 for supplying power to the electromagnetic coil portion 3 is integrally protruded from one side of the synthetic resin formation part 6.

An annular seal/cushion member 8 which is in close contact with a front end surface of the synthetic resin formation part 6 is attached to an outer periphery of the fuel nozzle cylinder portion 2. Also, an O-ring 9 is attached to a seal groove 4*a* on an outer periphery of the fuel introduction cylinder portion 4.

A rear end surface of the synthetic resin formation part 6 facing the fuel introduction cylinder portion 4 side is formed as a flat base surface 5.

On the other hand, the cylinder head Eh is provided with an injection valve mounting hole 10 whose inner end is open on a ceiling surface of each combustion chamber Ec, and an annular concave portion 11 which surrounds an outer opening end thereof. The fuel nozzle cylinder portion 2 of the fuel injection valve I is fitted in the injection valve mounting hole 10, and the seal/cushion member 8 is accommodated in the concave portion 11.

Further, the fuel distribution pipe D is arranged along the direction in which the plural cylinders of the engine E are arranged, and fuel is force-fed from one end side of the fuel distribution pipe D by an unillustrated fuel pump. A plurality of fuel supply caps Da arranged coaxially with the plurality of fuel injection valves I fitted in the plurality of injection valve mounting holes 10 project on one side surface of the fuel distribution pipe D. These fuel supply caps Da are fitted to their corresponding outer peripheries of the fuel introduction cylinder portions 4 of the fuel injection valves I. At this time, the O-ring 9 is in close contact with an inner peripheral surface of the fuel supply cap Da. A flat stopper surface 7 parallel to an axis A of the valve housing 1 is formed on an outer surface of each fuel supply cap Da. A bracket Db is fixed to the base of each fuel supply cap Da. The bracket Db is secured by a bolt 13 to a column 12 erected on an upper surface of the cylinder head Eh.

Figure 3:
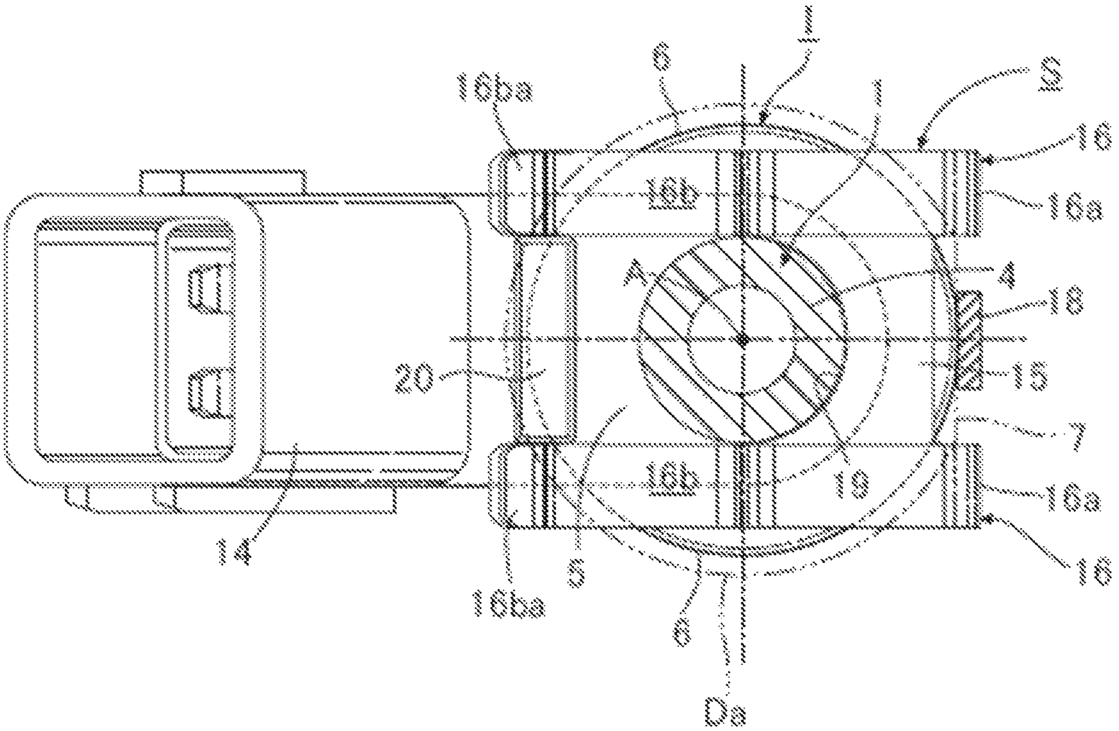
FIG. 3 is a cross-sectional view taken along line 3-3 of FIG. 2.
Figure 4:
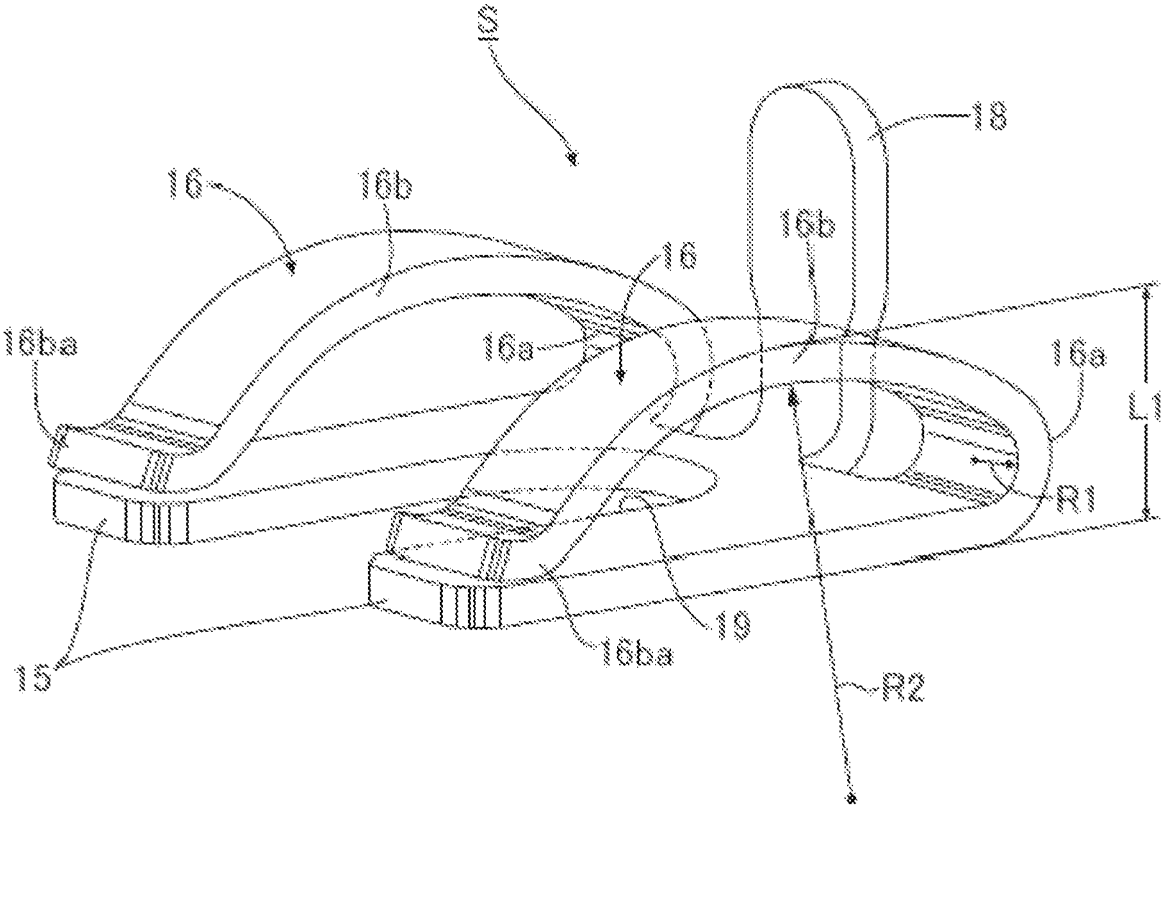
FIG. 4 is a single perspective view of an elastic support member in each figure.

As illustrated in FIGS. 2 to 4, the elastic support member S is formed by pressing a steel plate and is constituted of a base plate 15, an elastic piece 16, and a positioning piece 18.

The base plate 15 is installed to be overlapped on the base surface 5, and is provided in its center with a U-shaped notch 19 which allows the valve housing 1 to be received therein. A pair of elastic pieces 16 elastically contacting a front end surface of the fuel supply cap Da are formed to be integrally connected to one end of the base plate 15 opposite to the U-shaped notch 19. Both elastic pieces 16 are arranged with a gap therebetween allowing the fuel introduction cylinder portion 4 of the fuel injection valve I to be received therein.

Each elastic piece 16 is constituted of a first elastic portion 16*a* bent upward from one end of the base plate 15 in a horizontal U-shape, and a second elastic portion 16*b* which extends toward the other end while being bent upward from the first elastic portion 16*a* and whose tip portion 16*ba* is slidably and resiliently brought into contact with an upper surface of the base plate 15. The radius of curvature R2 of the second elastic portion 16*b* is set sufficiently larger than the radius of curvature R1 of the first elastic portion 16*a* (refer to FIG. 4).

Then, in the free state of the elastic piece 16, a distance L1 (refer to FIG. 4) from the top of the second elastic portion 16*b* to the bottom surface of the base plate 15 is set larger than a distance L2 (refer to FIG. 2) from the base surface 5 to the front end surface of the fuel supply cap Da. Therefore, when the base plate 15 and the elastic piece 16 are inserted between the base surface 5 and the fuel supply cap Da, the elastic piece 16 is resiliently brought into contact with the front end surface of the fuel supply cap Da while flexing the first and second elastic portions 16*a* and 16*b*. The tip portion 16*ba* of the second elastic portion 16*b* can slide on the upper surface of the base plate 15 when the first and second elastic portions 16*a* and 16*b* are flexed, and has an upwardly curved shape to make the sliding smooth.

One end of the base plate 15 is integrally continuously provided with a positioning piece 18 standing vertically upward from between the pair of elastic pieces 16. The positioning piece 18 is capable of abutting on the stopper surface 7 of the fuel supply cap Da.

A rotation-preventing protrusion 20 which protrudes from the base surface 5 is formed integrally with the synthetic resin formation part 6 between the valve housing 1 and the coupler 14. When the elastic support member S is placed in a fixed position between the synthetic resin formation part 6 and the fuel supply cap Da, the rotation-preventing protrusion 20 engages with the notch 19 of the base plate 15 and between the tip portions 16*ba* of the pair of elastic pieces 16, which resiliently contact the base plate 15.

Next, the action of this embodiment will be described.

Upon attaching the fuel injection valve I to the engine E, first, the fuel supply cap Da of the fuel distribution pipe D is fitted to the fuel introduction cylinder portion 4 of the fuel injection valve I. Next, with the opening of the U-shaped notch 19 of the base plate 15 at the top, the elastic support member S is inserted between the base surface 5 of the fuel injection valve I and the fuel supply cap Da from the outside of the fuel injection valve I on the side opposite to the coupler 14 to abut the positioning piece 18 against the stopper surface 7 of the fuel supply cap Da while receiving the valve housing 1 in the notch 19 of the base plate 15 and between the pair of elastic pieces 16.

Due to this abutment, the elastic support member S becomes non-rotatable with respect to the fuel supply cap Da.

Further, simultaneously with the above abutment, the rotation-preventing protrusion 20 of the synthetic resin formation part 6 is engaged with the notch 19 of the base plate 15 at the elastic support member S and between the pair of elastic pieces 16. Consequently, the fuel injection valve I is prevented from rotating about the axis A of the valve housing 1 with respect to the fuel supply cap Da.

Thereafter, the fuel nozzle cylinder portion 2 of the above fuel injection valve I is inserted into the fuel valve mounting hole 10 of the cylinder head Eh, and the seal/cushion member 8 being in close contact with the front end surface of the synthetic resin formation part 6 is accommodated in the concave portion 11. Then, while applying a compressive load to the elastic support member S, the bracket Db is fixed to the column 12 of the cylinder head Eh with the bolt 13.

At this time, the pair of elastic pieces 16 resiliently presses the front end surface of the fuel supply cap Da on the plane including the axis A of the valve housing 1 by the vertex of the second elastic portion **16*b* while flexing the first and second elastic portions 16*a* and 16*b*, and its pressing reaction force presses the base plate 15 against the base surface 5. Therefore, the fuel injection valve I is elastically held between the cylinder head Eh and the fuel supply cap Da through the elastic support member S and the seal/cushion member 8. Moreover, since the pressing reaction force of the elastic piece 16** against the fuel supply cap Da acts on the fuel injection valve I along its central axis A, it is possible to stabilize the support of the fuel injection valve I without tilting it.

Thus, the fuel injection valve I attached to the engine E is prevented from rotating about the axis A of the valve housing 1 with respect to the fuel supply cap Da via the elastic support member S, thereby making it possible to always stabilize the direction of the fuel injected from the fuel nozzle cylinder portion 2.

By the way, the prevention of the fuel injection valve I from rotating about the axis A of the valve housing 1 with respect to the elastic support member S is achieved by engaging the rotation-preventing protrusion 20 of the synthetic resin formation part 6 with the notch 19 of the base plate 15 originally provided in the elastic support member S and between the pair of elastic pieces 16 as described above. Therefore, the elastic support member S does not need to be provided with a special rotation-preventing piece as in the conventional art, and the shape of the elastic support member S can be simplified. Further, since the rotation-preventing protrusion 20 is integrally formed with the coupler 14 on the synthetic resin formation part 6 covering the valve housing 1 so as to enclose the valve housing 1 with the electromagnetic coil portion 3. Therefore, the number of times of machining each member is not increased, and the yield of the material is improved, thereby making it possible to reduce the cost of the support structure of the fuel injection valve I.

Incidentally, in the present invention, for example, the height of the rotation-preventing protrusion 20 may be set equal to the thickness of the base plate 15 so that only the notch 19 of the base plate 15 is engaged with the rotation-preventing protrusion 20, or the tip portions **16*ba* of the pair of elastic pieces 16 may be terminated before the rotation-preventing protrusion 20. However, as described above, if both the base plate 15 and the elastic piece 16 are engaged with the rotation-preventing protrusion 20, an engagement force between the elastic support member S and the rotation-preventing protrusion 20** is strengthened, and the rotation of the fuel injection valve I can be reliably prevented.

Also, since the rotation-preventing protrusion 20 is arranged between the valve housing 1 and the coupler 14, the elastic support member S can be easily engaged with the rotation-preventing protrusion 20 without being interfered with by the coupler 14 by inserting the elastic support member S from the opposite side of the coupler 14 when the elastic support member S is inserted between the fuel injection valve I and the fuel supply cap Da, and an assembling property is excellent.

Further, since each elastic piece 16 is constituted of the first elastic portion **16*a* having the small curvature radius R1 connected to one end of the base plate 15, and the second elastic portion 16*b* having the large curvature radius R2 extending from the first elastic portion 16*a* and bringing the tip portion 16*ba* into slidable contact with the upper surface of the other end of the base plate 15, the second elastic portion 16*b* is supported on both sides by the base plate 15 through its tip portion 16*ba* and the first elastic portion 16*a*. Therefore, even if the first elastic portion 16*a* is plastically deformed (generally, a portion bent with a small curvature radius is likely to be plastically deformed), it is possible to maintain a biasing function of each elastic piece 16 with respect to the fuel supply cap Da due to the elastic force of the second elastic portion 16*b*. Further, by making the radius of curvature R2 of the second elastic portion 16*b* larger than the radius of curvature R1 of the first elastic portion 16*a*, the height of each elastic piece 16 can be kept as low as possible, and the mounting of the elastic support member S into the narrow space between the base surface 5** and the fuel supply cap Da can be easily performed.

Although the embodiments of the present invention have been described above, the present invention is not limited thereto, and various design changes are possible without departing from the gist of the present invention. For example, the present invention can also be applied to a structure in which the fuel injection valve I is attached to an intake system of an engine.

DESCRIPTION OF REFERENCE NUMERALS

A . . . axis of valve housing
D . . . fuel distribution pipe
Da . . . fuel supply cap
E . . . engine
I . . . electromagnetic fuel injection valve
S . . . elastic support member
2 . . . fuel nozzle cylinder portion
3 . . . electromagnetic coil portion
4 . . . fuel introduction cylinder portion
5 . . . base surface
6 . . . synthetic resin formation part
7 . . . stopper surface
10 . . . injection valve mounting hole
14 . . . coupler
15 . . . base plate
16 . . . elastic piece
**16*ba*** . . . tip portion of elastic piece
18 . . . positioning piece

19 . . . notch
20 . . . rotation-preventing protrusion

The invention claimed is:

1. A fuel injection valve support structure in which a fuel nozzle cylinder portion (2) of a valve housing (1) is fitted into an injection valve mounting hole (10) of an engine E, a fuel supply cap (Da) of a fuel distribution pipe (D) supported by the engine (E) is fitted into a fuel introduction cylinder portion (4) of the valve housing (1), and an elastic support member (S) connected to the fuel supply cap (Da) so as to prevent rotation about an axis (A) of the valve housing (1) is interposed between the valve housing (1) and the fuel supply cap (Da) while biasing the valve housing (1) toward the injection valve mounting hole (10), wherein the elastic support member (S) is constituted of a base plate (15) abutting against a base surface (5) facing the fuel supply cap (Da) of the valve housing (1), and elastic pieces (16) each extending from one end of the base plate (15) and resiliently contacting the fuel supply cap (Da), wherein the base plate (15) is provided with a notch (19) which receives the valve housing (1), wherein the valve housing (1) is covered with a synthetic resin formation part (6) while protruding a power feeding coupler (14) to one side, wherein the base surface (5) is formed by a rear end surface of the synthetic resin formation part (6), and wherein the synthetic resin formation part (6) includes an edging plane edging from an edge of the base surface (5) to the coupler (14) to form one plane with the base surface (5), and a rotation-preventing protrusion (20) protruding from a transition portion straddling from the base surface (5) in the one plane to the edging plane to engage with the notch (19) and preventing a fuel injection valve (I) from rotating about the axis (A) of the valve housing (1).

2. The fuel injection valve support structure according to claim 1, wherein the elastic pieces (16) are formed in a pair so that a tip portion (16*ba*) of each of the elastic pieces (16) overlaps a tip portion of the base plate (15) while straddling the valve housing (1), and the rotation-preventing protrusion (20) also engages between the tip portions of the pair of elastic pieces (16).

3. The fuel injection valve support structure according to claim 1, wherein the rotation-preventing protrusion (20) is arranged between the valve housing (1) and the coupler (14).

4. The fuel injection valve support structure according to claim 2, wherein the rotation-preventing protrusion (20) is arranged between the valve housing (1) and the coupler (14).

* * * * *